(12) United States Patent
Inazumi et al.

(10) Patent No.: US 7,875,097 B2
(45) Date of Patent: Jan. 25, 2011

(54) METHOD OF GRANULATING RAW MATERIAL FOR SINTERING, AND METHOD OF MANUFACTURING SINTERED IRON ORE

(75) Inventors: Tadahiro Inazumi, Chiba (JP); Akio Uehara, Aichi (JP); Kazunari Hashiyama, Tokyo (JP)

(73) Assignee: Kyouzai Kogyo Co., Ltd., Tokyo (JP)

( * ) Notice: Subject to any disclaimer, the term of this patent is extended or adjusted under 35 U.S.C. 154(b) by 180 days.

(21) Appl. No.: 12/085,913

(22) PCT Filed: Dec. 2, 2005

(86) PCT No.: PCT/JP2005/022205

§ 371 (c)(1),
(2), (4) Date: Jun. 2, 2008

(87) PCT Pub. No.: WO2007/063603

PCT Pub. Date: Jun. 7, 2007

(65) Prior Publication Data

US 2009/0078088 A1     Mar. 26, 2009

(51) Int. Cl.
*C22B 1/14*     (2006.01)
(52) U.S. Cl. ............................. 75/749; 75/762; 75/961
(58) Field of Classification Search .................. 75/775, 75/320–323, 961, 749, 762
See application file for complete search history.

(56) References Cited

U.S. PATENT DOCUMENTS 3,732,062 A * 5/1973 Porteus ......................... 432/16
3,998,703 A * 12/1976 Harrell ......................... 201/32

5,102,586 A     4/1992 Fuji et al.

(Continued)

FOREIGN PATENT DOCUMENTS

EP         0415146 A1     3/1991

(Continued)

OTHER PUBLICATIONS

Machine translation of JP 1999-092810 (JP 11092810 A) published Apr. 1999.*

(Continued)

*Primary Examiner*—George Wyszomierski
*Assistant Examiner*—Tima M McGuthry-Banks
(74) *Attorney, Agent, or Firm*—Birch, Stewart, Kolasch & Birch, LLP

(57) ABSTRACT

A raw material for sintering of 100% in total is blended so as to adjust iron-containing dust and/or sludge to 60% or more, and coarse grains having a grain size of 2 mm or larger to 20% or more on the weight basis, one-third or less of the total amount of addition of coke breeze is added as a fuel, the blend is kneaded and granulated using a vibration kneading granulator to thereby produce granulated grains, the residual portion of the total amount of addition of coke breeze is added to the granulated grains, the blend is subjected to exterior coating granulation using a rolling type granulator, thus-granulated raw material for sintering is screened, and a fraction having a grain size of 1 mm or larger is used for sintering, making it possible to sinter microparticulate dust and microparticulate sludge as main raw materials, which have conventionally been used only to a limited amount of use.

13 Claims, 2 Drawing Sheets

U.S. PATENT DOCUMENTS 5,169,434 A     12/1992     Kumasaka et al.
6,342,089 B1 *    1/2002     McGaa ........................ 75/319
6,745,960 B1 *    6/2004     Myo et al. .................... 241/5

FOREIGN PATENT DOCUMENTS

| | | | |
|---|---|---|---|
| JP | 59-107036 | A | 6/1984 |
| JP | 63-176436 | A | 7/1988 |
| JP | 3-166321 | A | 7/1991 |
| JP | 06179928 | A * | 6/1994 |
| JP | 8-193226 | A | 7/1996 |
| JP | 10-330851 | A | 12/1998 |
| JP | 11092810 | A * | 4/1999 |
| JP | 2000-192153 | A | 7/2000 |
| JP | 2000-248320 | A | 9/2000 |
| JP | 2000-290732 | A | 10/2000 |
| JP | 2002-226920 | A | 8/2002 |
| JP | 2005097645 | A * | 4/2005 |
| JP | 2005-213593 | A | 8/2005 |

OTHER PUBLICATIONS

Machine translation of JP 2005-097645 published Apr. 2005.*
Machine translation of JP H06-179928 (06179928 A) published Jun. 1994.*
The Iron and Steel Institute of Japan (ISIJ), vol. 71, No. 10, p. 5-8, (1988).
English language abstract for BR19920003748A (Apr. 20, 1993), XP002520942.
English language abstract for JP53123303-A (Oct. 27, 1978), XP002520943.

* cited by examiner

ROTARY-HEARTH SINTERING MACHINE : PALLETS P ENDLESSLY TRAVEL ON THE SAME PLANE.

PLAN VIEW

SIDE ELEVATION

STRAIGHT-STRAND SINTERING MACHINE : PALLETS P ENDLESSLY TRAVEL ON THE VERTICAL SECTION.

SECTIONAL VIEW

US 7,875,097 B2

METHOD OF GRANULATING RAW MATERIAL FOR SINTERING, AND METHOD OF MANUFACTURING SINTERED IRON ORE

TECHNICAL FIELD

The present invention relates to a method of granulating raw material for sintering using microparticulate dust and microparticulate sludge as main raw materials, and a method of manufacturing sintered iron ore using the raw material for sintering granulated by the method of granulating raw material for sintering.

BACKGROUND ART

Dust and sludge produced as by-product in the individual processes of iron making, steel making, casting, rolling, machining and so forth at ironworks contain a large fraction having a grain size of as fine as several tens of micrometers or smaller, wherein a part of which is recycled as being used for sintering which employs usually iron ore powder as a main raw material.

The microparticulate dust and microparticulate sludge, however, may obstruct gas permeability and fusing performance in the process of sintering, and therefore only a limited amount of use is allowable. They may be used only to as much as several percent even if they were used as being mixed with iron ore powder, and may be recycled only to as much as 10% or around even if the granulation thereof were enhanced typically by mini-pelletizing.

On the other hand, some of the microparticulate dust and microparticulate sludge contain impurities such as zinc, alkali, oils and so forth. These impurities may be causative of various failures in the process of sintering. For this reason, most part of the microparticulate dust and microparticulate sludge with the impurities have not been recycled despite of their large contents of useful elements such as iron, carbon and so forth. For example, zinc contained therein may vaporize and disseminate, contained in the exhaust gas, adhere to a heat-resistance grate, and cause clogging. Alkali contained therein may worsen dust collection efficiency of a dust precipitator, and increase suspended particle concentration. Oils contained therein may be causative of sudden combustion of an electric dust precipitator, so that the amount of use is strictly limited.

On the other hand, there has been proposed a method of sintering using LD converter dust as the main raw material, typically in Patent Document 1. The technique makes use of exothermic effect of metal iron contained in the LD converter dust.

Patent Document 2 proposes updraft sintering (upward suction type) method, by which the LD converter dust is sintered while being removed with zinc (see FIG. 3).

Non-Patent Document 1 proposes, as a technique of consuming a large amount of iron ore particles having a particle size of several hundreds of micrometers, a method of granulating a microparticulate raw material (approximately 60%) and a nucleus material using preliminarily a drum mixer or disk pelletizer.

Similarly, as a technique of using a large amount of microparticulate iron ore, there is also provided a method of mixing 40% of microparticulate raw material to a common raw material for sintering (ore powder 60%), granulating the mixture using a disk pelletizer besides drum mixer to produce pellets of 5 to 10 mm, adding coke fines, and then sintering the pellets coated with coke.

Patent Document 4 proposes, as one technique of enhancing granulation, a vibration kneading granulation process by which a large number of compaction media are housed in a vessel, and allowing microparticulate raw material added with water to granulate in the vessel under an acceleration of circular vibration of 3 to 10 G (G: acceleration of gravity). This technique is reportedly effective when fine ore having a grain size of smaller than 63 µm is granulated to as much as 80% or more.

[Patent Document 1] Japanese Patent Application Laid-Open No. 2000-248320
[Patent Document 2] Japanese Patent Application Laid-Open No. H10-330851
[Patent Document 3] Japanese Patent Application Laid-Open No. H8-193226
[Patent Document 4] Japanese Patent Application Laid-Open No. H3-166321
[Non-Patent Document 1] "Shoketsu Genryo no Zoryu to sono Yakuwari (Granulation of Raw Material for Sintering and Roles Thereof", Tetsu-to-Hagane, Vol. 71, No. 10 (1988)

SUMMARY OF THE INVENTION

However, the sintering method disclosed in Patent Document 1 making use of exothermic effect of metal iron contained in LD converter dust is applicable only to the cases where the content of metal iron is large.

The updraft sintering disclosed in Patent Document 2 is operable only under narrow conditions of sintering strictly limiting thickness of sintering layers and wind velocity through sintering bed. Therefore, the method is not adoptable to the entire kind of the microparticulate dust and microparticulate sludge, either by the downdraft system or the updraft system, and cannot be understood as a method allowing stable sintering under general conditions of sintering.

The technique using a large amount of fine iron ore, disclosed in Non-Patent Document 1, needs additional facilities other than mixer-granulator used for conventional sintering process, and has not been practiced from the economical viewpoint. Moreover, effects of the technique are not so clear, because the granulation strength is low, and a large part of them may collapse during transportation period after the preliminary granulation, through the mixer-granulator, up to arrival at the sintering machine. It may be said that such technique cannot directly be applicable to the microparticulate dust and microparticulate sludge, which are inferior to fine iron ore in terms of granulability, and conclusively cannot be put into practical use.

No practical and commercial cases have been known with respect to sintering of the microparticulate dust and microparticulate sludge using the vibration kneading granulation process, capable of enhancing granulation, disclosed in Patent Document 4. Experiments by the present inventors actually using the microparticulate dust and microparticulate sludge proved that the sintering was strong to a certain degree, but was not stable.

As has been described in the above, the total production of the microparticulate dust and microparticulate sludge could not have been recycled by the prior art, and the state of things is such that they are committed to landfill. Some ironworks may treat them using high-temperature reduction facilities provided besides the sintering machine, while raising problems in drastic increase of cost including energy consumption, cost of facility, and cost of operation.

However, the microparticulate dust and microparticulate sludge have large iron contents, and are preferably recycled rather than being committed to landfill, and may preferably be treated by sintering which is far more advantageous over the high-temperature reduction in terms of energy consumption, cost of facility, and cost of operation.

The present invention is conceived after considering the above-described situation, and is to enable sintering using, as main raw materials, the microparticulate dust and microparticulate sludge which have been used only to a limited amount by the methods of sintering at present. The present invention is also to enable an economic and low-environmental-load(or burden) method of sintering, even if the microparticulate dust and microparticulate sludge contain impurities such as zinc, alkali and oils.

According to the present invention, there is provided a method of granulating raw material for sintering aimed at granulating a raw material for sintering, which includes blending a raw material for sintering of 100% in total, so as to adjust iron-containing dust and/or sludge to 60% or more, and coarse grains having a grain size of 2 mm or larger to 20% or more on the weight basis, adding thereto one-third or less of the total amount of addition of coke breeze as a fuel, and kneading and granulating the blend using a vibration kneading granulator to thereby produce granulated grains; and adding the residual portion of the total amount of addition of coke breeze to the granulated grains, and subjecting the blend to exterior coating granulation using a rolling granulator. In this case, sludge produced in a coke plant, or blast furnace ash may be available as a substitute for a part of, or the entire portion of the coke breeze.

According to the present invention, there is also provided a method of manufacturing sintered iron ore based on sintering using a fraction having a grain size of 1 mm or larger, out of the raw material for sintering granulated by the method of granulating a raw material for sintering according to the present invention.

In particular, for the case where impurities such as zinc, alkali and oils are contained, the sintering is preferably carried out based on updraft sintering. The sintering is preferably carried out using a rotary-hearth sintering machine with an apparatus of water-seal closed structure between an exhaust gas system and a pallet of said rotary-hearth sintering machine.

DETAILED DESCRIPTION OF THE PREFERRED EMBODIMENTS

Figure 1:
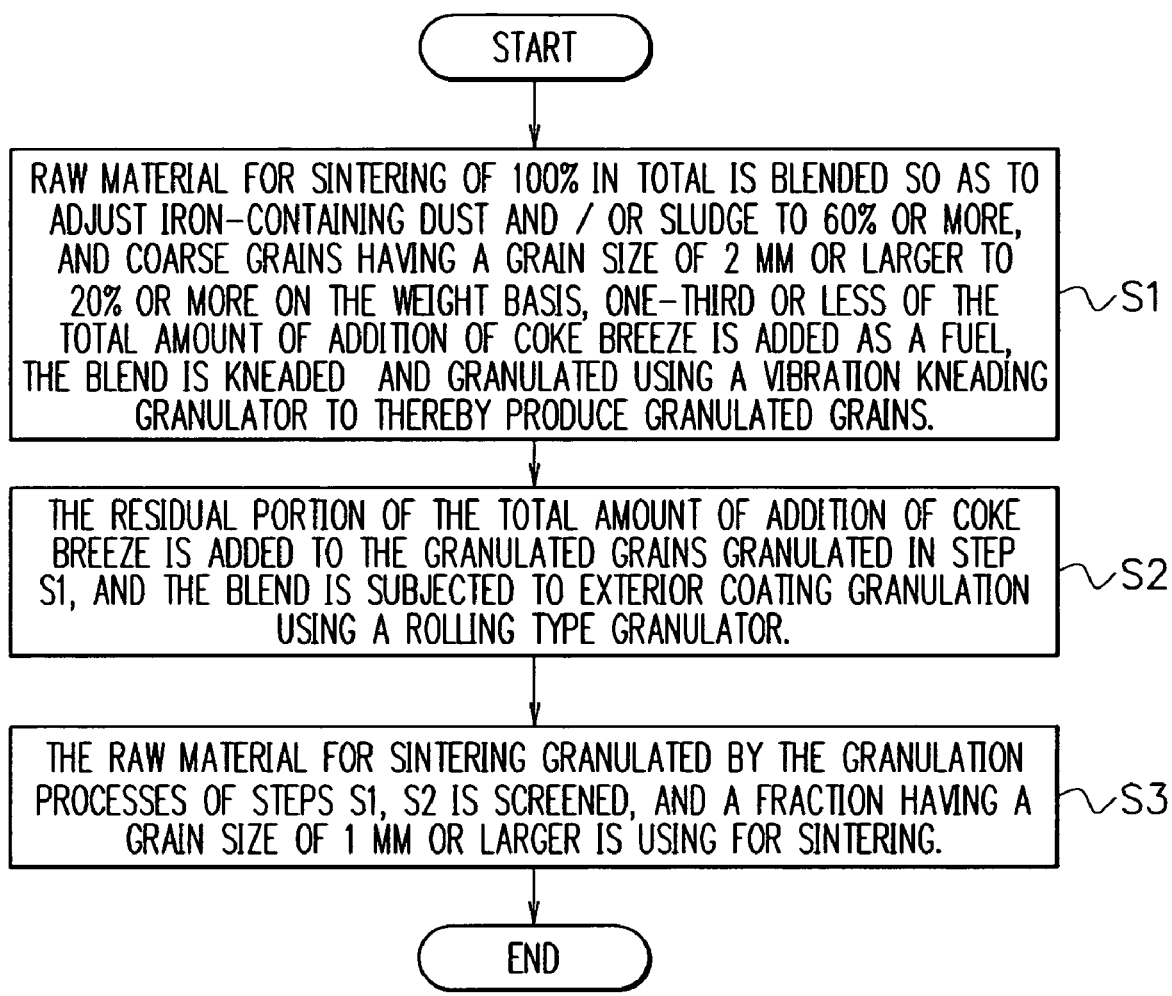
FIG. 1 is flow chart explaining a method of manufacturing sintered iron ore applied with the present invention.

Preferable embodiments of the present invention will be explained below, referring to the attached drawings.

First, details of how the present inventors reached, after extensive investigations, the method of granulating raw material for sintering and a method of manufacturing sintered iron ore will be explained. An essential point of the present invention is to provide a method of granulating a material for sintering using microparticulate dust and microparticulate sludge as main raw materials, and a method of manufacturing sintered iron ore, based on an original idea made on a method of granulation and a method of manufacturing sintered iron ore while taking sintering characteristics of microparticulate dust and microparticulate sludge different from those of iron ore powder into consideration.

The present inventors basically analyzed intrinsic causes for incapability of the conventional technique of sintering iron ore, which cannot sinter a large amount of microparticulate dust and microparticulate sludge. Finally, the present inventors found out that the fine particles of the microparticulate dust and microparticulate sludge, in particular those having a grain size of 100 µm or smaller, are likely to fluidize by blown air in the process of sintering, and that such fluidization makes the sintering and binding difficult.

This is because the microparticulate dust and microparticulate sludge, more likely to be free than the common raw materials of conventional sintering, are more difficult to be kept still, less likely to fuse and bind together even after being heated to sintering temperature, and is consequently less likely to form a sintered compact. It was made clear that, as a consequence, the sintering failure is ascribable to that they disseminate in a form of dust in the exhaust gas, rather than being grown into a solid sintered compact even if they should sinter.

Such sintering reaction proceeds in the pallet, so that the state of proceeding thereof is blinded and hidden in a "black box". Therefore, the present inventors made an original devise of a specialized transparent sintering pot for testing, and investigated the appropriate sintering reaction to further details.

A basic condition for stable sintering of the microparticulate dust and microparticulate sludge is to prevent the fine particles from being kept in a free state. In the conventional sintering of iron ore powder using a raw material having a mean particle size of relatively as coarse as the order of millimeter, the raw material for sintering could be sintered anyhow even if it contains a small amount of fine particles, because they are incorporated into quasi-particles, despite some degradation in the yield and in the productivity in term of sintering performance.

For this reason, the raw material blend used at present is sintered generally under a content of 20% or around of iron ore particles as fine as of 1 mm or below. However, increase in the content of microparticulate dust and microparticulate sludge degrades the production speed, and the sintering will no more proceed if the content exceeds 30%. This phenomenon has been well known in general, wherein the present inventors found out that the causes for this failure reside in brittleness of the sintered compact of the particles formed in the process of sintering of the microparticulate dust and microparticulate sludge, based on fluidization phenomenon, or nearly under fluidization.

The countermeasure therefor may be such as producing granulated grains to as strong enough as inhibiting the fluidization of the microparticulate dust and microparticulate sludge in the process of sintering, so that an experimental sintering was carried out while excluding ungranulated particles from the material for sintering.

After our repetitive experiments aimed at finding out the minimum granulatable grain size under which the ungranulated particles can stably be sintered, it was made clear that the critical lower limit of on-screen grain size is 1 mm, and that grains screened through a 1-mm-mesh or larger screen can stably be sintered.

It was also made clear from our repetitive experiments that when the granulated grains which remain on a screen are weak, they may return back to their free state in the process of sintering, so that the granulation to as strong enough as preventing them from returning back to their free state is necessary.

It was made clear also that formation of hard granulated grains from the microparticulate dust and microparticulate sludge is difficult, so far as the conventional rolling type granulation using a drum granulator or pan palletizer is adopted. Mixing granulation such as using Eirich mixer especially adopted to granulation of iron ore may produce granulated grains slightly harder than those obtained by rolling type granulation, but the granulated particles of the microparticulate dust and microparticulate sludge were found to give only insufficient strength.

In contrast, it was made clear that granulation based on vibration acceleration granulation technique, such as using a vibro-explorer, at an acceleration of 6 G or above enabled strong granulation. It was also made clear that water in the microparticulate dust and microparticulate sludge is non-uniformly distributed in granulated particles on the spatial basis, so that dry out of the non-uniformly distributed water at drying temperature during sintering may produce voids where water once existed, and may induce collapse and fluidization of the particles. It was also found that the granulation proceeded under an acceleration of 6 or above, while keeping the water content within a 10% range of the optimum value, may successfully prevent collapse and fluidization of particles.

The present inventors also found out that sintering may stably be proceeded in some cases but may not in other cases, even with an effort of preventing the particles from being set free, and made extensive investigations to find causal factors. As a consequence, it was made clear that the state of production of molten liquid in the process of sintering should be controlled as being adapted to the fusing characteristics of the microparticulate dust and microparticulate sludge, in view of stable sintering.

Generally, fine particles having an extremely large specific surface area, such as the microparticulate dust and microparticulate sludge, are likely to fuse in the process of sintering, so that an aggregate only composed of the microparticulate dust and microparticulate sludge may melt down at a time, when it reaches a certain high temperature, so that it is principally difficult to form and sustain a porous sintered compact which is a proper form of sinter product.

In addition, in the general sintering, coarse grains form a solid skeleton, the molten liquid surround the surface of the grains, the coarse grains bind with each other using the molten liquid as a binder, and thereby the sintered compact is gradually formed in turn as the sintering reaction proceeds. At the same time, the coke breeze contained in the raw material keeps to combust under ventilation during sintering, so that current system of sintering iron ore powder, allowing the sintering to proceed with the aid of this heat, cannot maintain the reaction unless the porous compact body is formed while ensuring therein formation of through-pores for ventilation.

For an exemplary case where the molten liquid is excessively produced in the process of sintering, the molten liquid fills up voids between the coarse grains so as to choke up the ventilation pores, and the sintering reaction no more proceeds. Therefore, it has been well known that control of the molten liquid is an essential point in the sintering operation.

For this reason, use of a large amount of microparticulate dust and microparticulate sludge may be more likely to reduce the ratio of coarse particles which form the nucleus, to fill up the gaps between the coarse grains, and to cause choking-up of the ventilation pores if the raw material tends to fuse at a time by its nature. For stable sintering of a large amount of microparticulate dust and microparticulate sludge, it is therefore necessary to find out a technique of fusion control adapted to the fusing characteristics of the microparticulate dust and microparticulate sludge.

After extensive investigations, the present inventors found out that sintering of the entire microparticulate dust and microparticulate sludge only by themselves are difficult, that the sintering may be stabilized only when the raw material blend contains coarse grains of 2 mm or larger to as much as 20% or more, and that, at the same time, some original idea on combustion control of cokes may be necessary in order to control production of the molten liquid.

The nucleus-forming coarse grains are contained relatively a large amount in the raw material blend for sintering used for iron ore sintering, but increase in the nucleus-forming material conversely decreases the ratio of blending of the microparticulate dust and microparticulate sludge which increase use is target of the present invention. In order to ensure the ventilation pores using a possibly minimum amount of nucleus-forming material, it may therefore be necessary to provide a technique of controlling quantity of molten liquid, capable of ensuring a certain amount of molten liquid necessary to make bind structure of sinter, while suppressing melting of the nucleus-forming material.

Production of the molten liquid in the process of sintering, induced by combustion heat of the cokes, may be controllable to a certain extent by the amount of addition of cokes, but may be controllable also by alignment of cokes in granulated grains, which is another measure for combustion control of cokes. One known technique in this field is a cokes interior/exterior technique making distribution of cokes differed between the inside and outside of the granulated grains.

On the other hand, the amount of cokes may preferably be reduced as possible when the microparticulate dust and microparticulate sludge are granulated, because the coke breeze acts to lower the strength of grains in the process of granulation. After through investigations into optimum overall conditions for granulation, capable of optimizing production of molten liquid of the microparticulate dust and microparticulate sludge, while suppressing the amount of use of nucleus-forming material, the present inventors found out that it is necessary, for stable sintering, to suppress the amount of the interior cokes, under the interior/exterior distribution, to as much as one-third or less of the total amount of addition of coke breeze.

Then, at the initial stage of granulation, the total amount of microparticulate dust and microparticulate sludge, added with a part of cokes (one-third or less of the total amount of coke breeze), are granulated by vibration kneading granulation, and the granulation is continued by adding the residual amount (two-thirds or more of the total amount of coke breeze) of cokes to the granulated grains so as to cover the surface thereof. Smaller amount of cokes may be better in the process of vibration kneading granulation from the viewpoint of granulated particle strength, but the interior cokes may be reduced only to a certain lower limit from the viewpoint of production of molten liquid, indicating existence of an optimum range with respect to the ratio of the amount of interior/exterior cokes.

As raw material of the nucleus-forming coarse grain may be available returned sinter fines, or may be coarse grains of iron ores or lime stone. The coke breeze added as a fuel may be used as it were because it has conventionally been applied to sintering of iron ore, but a part of, or entire portion of which may be substituted by sludge produced in coke plants, or by blast furnace fly ash.

Specifically summarizing now the above-described method, sintering using the microparticulate dust and microparticulate sludge as the main raw material may be practiced by carrying out the processes shown in FIG. 1.

First, a raw material for sintering of 100% in total is blended so as to adjust iron-containing dust and/or sludge to 60% or more, and coarse grains having a grain size of 2 mm or larger to 20% or more on the weight basis, one-third or less of the total amount of addition of coke breeze as a fuel is added thereto, and the blend is kneaded and granulated using a vibration kneading granulator to thereby produce granulated grains (step S1). The ratio of blending herein is expressed on the dry weight basis. For the rest of 100% in total of the raw material to be sintered, conventional iron-containing raw material for sintering such as iron ore powder, returned sinter fines and so forth, may be used.

Next, the residual portion of the total amount of addition of coke breeze is added to the granulated grains granulated in step S1 in the above, and the blend is subjected to exterior coating granulation using a rolling type granulator (step S2).

The raw material for sintering, granulated by the granulation processes in steps S1, S2 described in the above, is sieved, and a fraction having a grain size of 1 mm or larger is used for sintering (step S3).

As has been described in the above, stable sintering using the microparticulate dust and microparticulate sludge as main raw materials may be realized, by keeping the ratio of content of the nucleus-forming material in the raw material blend for sintering within a certain level, by carrying out cokes interior/exterior granulation while keeping the ratio of interior/exterior cokes at a certain condition, and by using only strong granulated grains containing no fraction having a grain size of 1 mm or smaller. The conventional sintering of iron ore could not stably sinter the raw material containing 30% or more of microparticulate dust and microparticulate sludge, whereas by adopting the conditions for sintering described in the above, it became feasible to stably sinter the raw material even if the microparticulate dust and microparticulate sludge are blended to as much as 60% or more. As has been described in the above, sintered iron ore is now producible with high efficiency making use of the conventional facility, by using the microparticulate dust and microparticulate sludge produced as by-product in ironworks, extremely small in grain size, hard to granulate and hard to sinter, which are intrinsically different from sintering characteristics of ordinal iron ore, and by sintering the raw material by a method of sintering completely different from the conventionally-adopted methods of sintering.

By the way, some microparticulate dust and microparticulate sludge may contain impurities allowing manufacturing of sintered iron ore, but some may obstruct sustenance of stable production of sintered iron ore. As has been described in the above, zinc contained therein may form zinc white and may vaporize into the exhaust gas in the process of sintering, and may clog grate, or may adhere on an exhaust pipe, a dust precipitator or a blower, to thereby obstruct proceeding of operation. The alkali metals contained therein may not only degrade the dust collection efficiency of electric precipitator, but may also be causative of increase in the amount of emission of suspended particles through a chimney out into the air, and may therefore not be adoptable as the raw material for sintering. The oils contained therein may be causative of sudden combustion of an electric dust precipitator, and may be causative of adhesion of uncombusted oils onto the blower, so that the oils may be adoptable only to as much as a certain limited amount.

The present inventors went into through investigations to solve the above-described problems, and finally reached a method capable of sintering a large amount of particulate dust and microparticulate sludge containing impurities, which could have not been used up to a large amount by the conventional method of sintering. The details will be described below.

The reason why the microparticulate dust and microparticulate sludge containing impurities cannot be used is that the sintering machine has a downdraft configuration, having the dust precipitator and the suction blower arranged in the exhaust system, and this may be causative of failure. To solve this problem, the method of sintering may need a mechanism in which the exhaust system is provided independently from the grate, blower and so forth, so as to protect the individual facilities from various failures ascribable to the impurities in the exhaust gas.

The updraft sintering is a method by which sintering is proceeded while introducing the air compressed by the blower in an air box under pallet of the sintering machine, and blowing, under pressure, the air up through the grate of the pallets bottom. By the method, the exhaust gas dissipates from the top surface of the pallets of the sintering machine, so that impurities such as zinc, alkali, uncombusted oils and so forth, even if contained therein, will never be brought into contact with the grate nor the blower, inducing no failures. A device removing these impurities may also be provided as being brought into direct contact with the exhaust gas system, by which the impurities may efficiently be removed.

In general, stable sintering is more difficult in the updraft sintering than in the downdraft sintering. In the downdraft sintering, the sintered compact is produced while the molten liquid in the downdraft sintering gradually flows down by gravity, whereas in the updraft sintering, the particles become more difficult to fuse, because the molten liquid cannot move upward. In particular, the microparticulate dust and the microparticulate sludge are likely to fluidize by a rapid air flow passing through the sintering layer at a speed of several meters per second, making fusion binding (or sintering) difficult. In the updraft sintering proceeded under more severe sintering conditions than in the downdraft sintering, adoption of the method of granulating raw material for sintering and the method of manufacturing sintered iron ore of the present invention using the microparticulate dust and the microparticulate sludge, which are hard to sinter, as main raw materials is very effective, and thereby stable sintering may be realized using the impurity-containing microparticulate dust and the microparticulate sludge as main raw materials.

Most of updraft sintering machines generally have a straight-type strand, wherein movable pallets and a strand frame are brought into contact on a rail at mechanical sliding portions while ensuring only a limited degree of air-tightness, causing a considerable air leakage and noise. The air leakage is also causative of unnecessary consumption of electric energy of the blower.

Figure 2A:
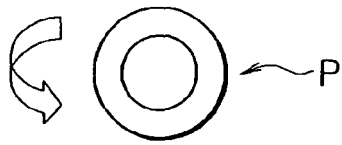
FIG. 2A is a drawing explaining an outline of a rotary-hearth sintering machine (DL type machine)
Figure 2A:
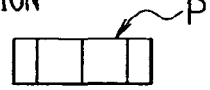
Figure 2B:
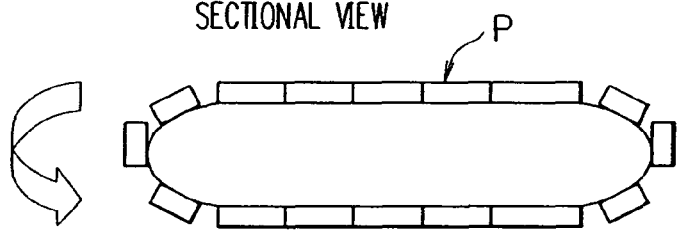
FIG. 2B is a drawing explaining a straight-strand sintering machine (DL type machine)
Figure 3:
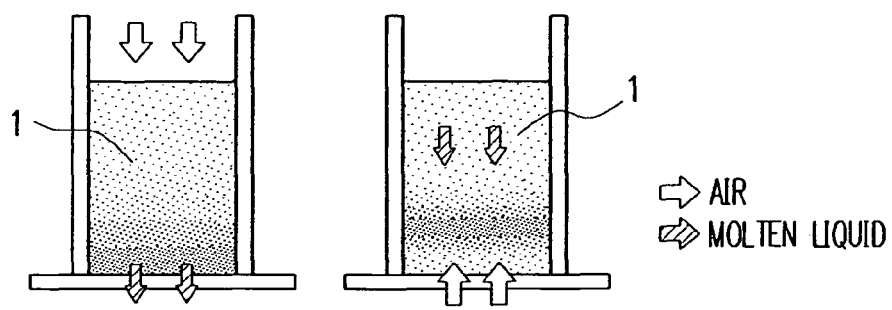
FIG. 3 is a drawing schematically showing a state of proceeding of sintering based on downdraft ventilation and updraft ventilation.

As shown in FIG. 2B, the strand is configured so as to allow the pallets P to move in an endless manner. Because the route of return pallets lies below the strand, the eaves height of facility becomes large, and not only increases costs of facility, but also makes the machine incapable of suppressing dust. Since the pallets P tends to cause heavy material fatigue under repetitive heating load, a steel of expensive quality is used therefor.

In order to configure a sintering machine solved in the above-described problems, small in environmental load, and suppressed in costs of facility and operation, it may be necessary from the view point of mechanism that the sintering machine would have no return pallets. Although conventionally been configured as a straight line type, now the sintering machine may be configured as rotary-hearth type as schematically shown in FIG. 2A, by which the return pallets may be omissible, and the air box and the pallets P and the frame may be integrated. Accordingly, the air leakage may completely be avoidable, and extremely clean sintering as compared with the conventional sintering machine, completely suppressed in dust generation from the return pallets, may be realized.

The rotary-hearth sintering machine is suitable as a sintering machine disusing the return pallets, and may be applicable both to the downdraft sintering and the updraft sintering. Sintering using, in particular, the microparticulate dust and microparticulate sludge as the main raw materials has suffered from heavy dust generation, and large air leakage due to increased ventilation resistance, thereby the conventional sintering machine having the return pallets has been limited in performance. Placing this point into focus, adoption of the rotary-hearth system to the method using the microparticulate dust and microparticulate sludge as main materials may be effective, and may realize sintering suppressed in problematic dust generation and noise from the sintering machine, moderated in the environmental load, lowered in the cost for facility, reduced in the air leakage, and reduced in the unit consumption of electricity.

If the rotary-hearth system is used in the updraft sintering, the rotating pallets and a stationary exhaust gas system may be sealed using a water-seal device, and thereby the exhaust gas may be confined (see Patent Document 3). Adoption of this technique allows simple operation of exhaust gas processing, because the exhaust gas system thereof has no blower provided therein, unlike the downdraft sintering system. Adoption of this technique is extremely effective in particular to treatment of exhaust gas generated from sintering of microparticulate dust and microparticulate sludge containing impurities such as zinc oxide, alkali metals, uncombusted oils and so forth.

EXAMPLE 1

One hundred percent in total of a raw material to be sintered was made up by 80% of LD converter dust, and 20% of coarse returned sinter fines. One percent (percentage (dry weight) assuming the amount of raw material to be sintered as 100) of blast furnace secondary fly ash was externally added thereto as a fuel, the blend was kneaded and granulated for 4 minutes using a vibration kneading granulator, further added with 3% (percentage (dry weight) assuming the amount of raw material to be sintered as 100) of blast furnace secondary fly ash, and subjected to rolling type granulation using a pan pelletizer. The granulated grains were then allowed to pass through a 3-mm-mesh vibration screen device, and those of 1 mm or larger were charged into a rotary-hearth sintering machine for updraft sintering. Since the grains contain zinc dust, the portion between the exhaust gas system and the pallets of the sintering machine was configured by a water-seal closed structure, coarse dust in the exhaust gas was then removed using a cyclone dust collector, followed by rapid cooling. Zinc oxide is then recovered using a zinc oxide collector, and the exhaust gas was emitted out into the air after dust removal using a bag-filter dust collector.

EXAMPLE 2

One hundred percent in total of a raw material to be sintered was made up by 35% of oil-containing sludge, 45% of lime sludge, and 20% of coarse return fines. Three percent (percentage (dry weight) assuming the amount of raw material to be sintered as 100) of coke breeze was externally added thereto as a fuel, the blend was kneaded and granulated for 4 minutes using a vibration kneading granulator, further added with 6% (percentage (dry weight) assuming the amount of raw material to be sintered as 100) of coke breeze, and subjected to rolling type granulation using a pan pelletizer. Granulated grains of 1 mm or larger were collected through a vibration screen device, and then subjected to updraft sintering using a rotary-hearth sintering machine. The portion between the exhaust gas system and the pallets of the sintering machine was configured by a water-seal closed structure, coarse dust in the exhaust gas was then removed using a cyclone dust collector, and the exhaust gas was emitted out into the air after cleaned through a porous activated cokes packed layer.

EXAMPLE 3

One hundred percent in total of a raw material to be sintered was made up by 45% of iron-containing dust 45%, 15% of iron-containing sludge, 5% of waste powder from iron ore, and 25% of return fines. One-and-a-half percent (percentage (dry weight) assuming the amount of raw material to be sintered as 100) of coke breeze was externally added thereto as a fuel, the blend was kneaded and granulated for 4 minutes using a vibration kneading granulator, further added with 4% (percentage (dry weight) assuming the amount of raw material to be sintered as 100) of coke breeze, and subjected to rolling type granulation using a pan pelletizer. Granulated grains of 1 mm or larger were collected through a vibration screen device, and then subjected to sintering using a downdraft DL (Dwight-Lloyd) sintering machine.

EXAMPLE 4

One hundred percent of 5%-oil-containing sludge (fine particulate scale) was used as a raw material, and kneaded for 4 minutes using a vibration kneading granulator without being added with fuel, granulated grains of 1 mm or larger was collected through a vibration screen device, and allowed to sinter using a rotary-hearth updraft sintering machine. The exhaust gas containing dioxin was prevented from being emitted into the air by providing a water-seal closed structure to the portion between the exhaust gas system and the pallets of the sintering machine, and emitted through a porous activated coke packed layer after being removed with dust using a cyclone dust collector and a bag filter.

INDUSTRIAL APPLICABILITY

The present invention enables high efficiency sintering using microparticulate dust and microparticulate sludge, which are small in grain size, less likely to be granulated, and difficult to sinter, as main raw materials, using a conventionally-used sintering facility.

The invention claimed is:

1. A method of manufacturing sintered iron ore based on sintering wherein the method comprises:
   (1) granulating a raw material for sintering by:
      (a) blending a raw material for sintering of 100% in total, so as to adjust iron-containing dust and/or sludge to 60% or more, and coarse grains having a grain size of 2 mm or larger to 20% or more on the weight basis, adding thereto one-third or less of the total amount of addition of coke breeze as a fuel, and kneading the granulating the blend using a vibration kneading granulator to thereby produce granulated grains; and (b) adding the residual portion of the total amount of addition of coke breeze to said granulated grains, and subjecting the blend to exterior coating granulation using a rolling granulator to produce a granulated raw material for sintering; and (2) screening the granulated raw material for, sintering to produce a fraction having a grain size of 1 mm or larger; and (3) sintering the fraction having a grain size of 1 mm or larger to produce sintered iron ore.

2. The method of manufacturing sintered iron ore according to claim 1, wherein sludge produced in a coke plant, or blast furnace ash is available as a substitute for a part of, or the entire portion of said coke breeze.

3. The method of manufacturing sintered iron ore according to claim 1, wherein the sintering is updraft sintering.

4. The method of manufacturing sintered iron ore according to claim 2, wherein the sintering is updraft sintering.

5. The method of manufacturing sintered iron ore according to claim 1, wherein the sintering is carried out using a rotary-hearth sintering machine.

6. The method of manufacturing sintered iron ore according to claim 2, wherein the sintering is carried out using a rotary-hearth sintering machine.

7. The method of manufacturing sintered iron ore according to claim 3, wherein the sintering is carried out using a rotary-hearth sintering machine.

8. The method of manufacturing sintered iron ore according to claim 4, wherein the sintering is carried out using a rotary-hearth sintering machine.

9. The method of manufacturing sintered iron ore according to claim 5, wherein a portion between an exhaust gas system and a pallet of said rotary-hearth sintering machine has a water-seal closed structure.

10. The method of manufacturing sintered iron ore according to claim 6, wherein a portion between an exhaust gas system and a pallet of said rotary-hearth sintering machine has a water-seal closed structure.

11. The method of manufacturing sintered iron ore according to claim 7, wherein a portion between an exhaust gas system and a pallet of said rotary-hearth sintering machine has a water-seal closed structure.

12. The method of manufacturing sintered iron ore according to claim 8, wherein a portion between an exhaust gas system and a pallet of said rotary-hearth sintering machine has a water-seal closed structure.

13. The method of manufacturing sintered iron ore according to claim 1, wherein said coarse grains are returned sinter fines, coarse grains of iron ores or limestone.

* * * * *